US012149384B2

(12) United States Patent
Lin et al.

(10) Patent No.: US 12,149,384 B2
(45) Date of Patent: Nov. 19, 2024

(54) METHODS AND APPARATUSES FOR UPLINK CHANNEL SOUNDING BETWEEN BWPs

(71) Applicant: Samsung Electronics Co., Ltd., Suwon-si (KR)

(72) Inventors: Qiongjie Lin, Sunnyvale, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 17/443,023

(22) Filed: Jul. 19, 2021

(65) Prior Publication Data

US 2022/0045884 A1 Feb. 10, 2022

Related U.S. Application Data

(60) Provisional application No. 63/062,113, filed on Aug. 6, 2020.

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04W 52/143* (2013.01); *H04W 72/0453* (2013.01); *H04W 72/23* (2023.01)

(58) Field of Classification Search
CPC ..... H04L 5/001; H04L 5/0051; H04L 5/0098; H04L 25/0224; H04L 25/0226;
(Continued)

(56) References Cited

U.S. PATENT DOCUMENTS 10,778,475 B2 * 9/2020 Chen ..................... H04W 72/23
10,999,103 B2 * 5/2021 Wei ....................... H04L 5/0094
(Continued)

FOREIGN PATENT DOCUMENTS

AU 2019242360 A1 * 10/2020 ............. H04L 5/001
CA 3060839 A1 * 5/2020 ............. H04B 1/713
(Continued)

OTHER PUBLICATIONS

International Search Report and Written Opinion of the International Searching Authority dated Nov. 10, 2021, in connection with International Application No. PCT/KR2021/010162, 9 pages.
(Continued)

*Primary Examiner* — Eric Nowlin

(57) ABSTRACT

Methods and apparatuses for uplink (UL) channel sounding between bandwidth parts (BWPs). A method for operating a user equipment (UE) includes receiving first information for a set of UL BWPs of a serving cell, wherein the set of UL BWPs includes more than one UL BWP and receiving second information, for each UL BWP from the set of UL BWPs, for sounding reference signal (SRS) resource sets. The method further includes determining, for each UL BWP from the set of UL BWPs, corresponding first SRS resources from the SRS resource sets and transmitting a SRS, in each UL BWP from the set of UL BWPs, using the corresponding first SRS resources.

17 Claims, 11 Drawing Sheets

(51) Int. Cl.
  *H04W 52/14* (2009.01)
  *H04W 72/0453* (2023.01)
  *H04W 72/23* (2023.01)

(58) Field of Classification Search
  CPC ............ H04W 52/143; H04W 52/146; H04W 52/346; H04W 72/0453; H04W 72/23
  See application file for complete search history.

(56) References Cited

U.S. PATENT DOCUMENTS

| | | | |
|---|---|---|---|
| 11,184,140 B2 * | 11/2021 | Zhou | H04B 1/713 |
| 11,317,400 B2 * | 4/2022 | Yokomakura | H04L 5/0094 |
| 11,382,121 B2 * | 7/2022 | Marinier | H04L 5/0092 |
| 11,546,114 B2 * | 1/2023 | Zarifi | H04L 41/0896 |
| 2019/0261320 A1 * | 8/2019 | Yu | H04W 56/001 |
| 2019/0274162 A1 * | 9/2019 | Zhang | H04W 72/0453 |
| 2019/0281588 A1 | 9/2019 | Zhang et al. | |
| 2019/0349060 A1 | 11/2019 | Liao et al. | |
| 2019/0349161 A1 | 11/2019 | Jin et al. | |
| 2020/0036556 A1 * | 1/2020 | Wei | H04W 72/21 |
| 2020/0106647 A1 * | 4/2020 | Chen | H04L 1/0026 |
| 2020/0145169 A1 * | 5/2020 | Zhou | H04W 76/27 |
| 2020/0177353 A1 * | 6/2020 | Ding | H04L 5/0094 |
| 2020/0196343 A1 * | 6/2020 | Marinier | H04L 1/1896 |
| 2020/0322108 A1 * | 10/2020 | Liu | H04L 27/262 |
| 2020/0351130 A1 * | 11/2020 | Chen | H04L 5/0092 |
| 2020/0358576 A1 * | 11/2020 | Zarifi | H04L 5/0051 |
| 2021/0058910 A1 * | 2/2021 | Yokomakura | H04L 5/0048 |
| 2021/0159966 A1 * | 5/2021 | Xi | H04B 7/088 |
| 2021/0392609 A1 * | 12/2021 | Siomina | H04W 64/00 |
| 2022/0039028 A1 * | 2/2022 | Wernersson | H04B 7/0695 |
| 2022/0279561 A1 * | 9/2022 | Marinier | H04L 1/1896 |
| 2023/0023982 A1 * | 1/2023 | Kim | H04L 1/08 |
| 2023/0156714 A1 * | 5/2023 | Marinier | H04W 72/21 370/330 |
| 2023/0208578 A1 * | 6/2023 | Liu | H04L 5/0082 370/330 |
| 2023/0216635 A1 * | 7/2023 | Park | H04B 17/373 370/329 |

FOREIGN PATENT DOCUMENTS

| | | | | |
|---|---|---|---|---|
| CN | 109474400 A | * | 3/2019 | ......... H04L 25/0224 |
| EP | 3648386 A1 | * | 5/2020 | ............ H04B 1/713 |
| EP | 3780807 A1 | * | 2/2021 | ............ H04L 5/001 |
| EP | 3565171 B1 | * | 10/2021 | ......... H04L 25/0224 |
| EP | 3780807 B1 | * | 3/2023 | ............ H04L 5/001 |
| EP | 3857785 B1 | * | 8/2023 | ........... H04B 7/0404 |
| WO | WO-2020064727 A1 | * | 4/2020 | ........... H04B 7/0404 |
| WO | WO-2022153284 A1 | * | 7/2022 | |

OTHER PUBLICATIONS

"5G; NR; Physical channels and modulation (3GPP TS 38.211 version 16.2.0 Release 16)", ETSI TS 138 211 V16.2.0, Jul. 2020, 136 pages.

"5G; NR; Multiplexing and channel coding (3GPP TS 38.212 version 16.2.0 Release 16)", ETSI TS 138 212 V16.2.0, Jul. 2020, 154 pages.

"5G; NR; Physical layer procedures for control (3GPP TS 38.213 version 16.2.0 Release 16)", ETSI TS 138 213 V16.2.0, Jul. 2020, 180 pages.

"5G; NR; Physical layer procedures for data (3GPP TS 38.214 version 16.2.0 Release 16)", ETSI TS 138 214 V16.2.0, Jul. 2020, 167 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

"5G; NR; Medium Access Control (MAC) protocol specification (3GPP TS 38.321 version 16.1.0 Release 16)", ETSI TS 138 321 V16.1.0, Jul. 2020, 153 pages.

* cited by examiner

METHODS AND APPARATUSES FOR UPLINK CHANNEL SOUNDING BETWEEN BWPs

CROSS-REFERENCE TO RELATED APPLICATION AND CLAIM OF PRIORITY

This application claims priority under 35 U.S.C. § 119(e) to U.S. Provisional Patent Application No. 63/062,113 filed Aug. 6, 2020, which is hereby incorporated by reference in its entirety.

TECHNICAL FIELD

The present disclosure relates generally to wireless communication systems and, more specifically, the present disclosure relates to uplink (UL) channel sounding between bandwidth parts (BWPs).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to UL channel sounding between BWPs.

In one embodiment, a method is provided. The method includes receiving first information for a set of UL BWPs of a serving cell, wherein the set of UL BWPs includes more than one UL BWP and receiving second information, for each UL BWP from the set of UL BWPs, for sounding reference signal (SRS) resource sets. The method further includes determining, for each UL BWP from the set of UL BWPs, corresponding first SRS resources from the SRS resource sets and transmitting a SRS, in each UL BWP from the set of UL BWPs, using the corresponding first SRS resources.

In another embodiment, a user equipment (UE) is provided. The UE includes a transceiver configured to receive first information for a set of UL BWPs of a serving cell, wherein the set of UL BWPs includes more than one UL BWP, and second information, for each UL BWP from the set of UL BWPs, for SRS resource sets. The UE further includes a processor operably connected to the transceiver. The processor is configured to determine, for each UL BWP from the set of UL BWPs, corresponding first SRS resources from the SRS resource sets. The transceiver is further configured to transmit a SRS, in each UL BWP from the set of UL BWPs, using the corresponding first SRS resources.

In yet another embodiment, a base station (BS) is provided. The BS includes a transceiver configured to transmit first information for a set of UL BWPs of a serving cell, wherein the set of UL BWPs includes more than one UL BWP, and second information, for each UL BWP from the set of UL BWPs, for SRS resource sets. The BS further includes a processor operably connected to the transceiver. The processor is configured to determine, for each UL BWP from the set of UL BWPs, corresponding first SRS resources from the SRS resource sets. The transceiver is further configured to receive a SRS, in each UL BWP from the set of UL BWPs, using the corresponding first SRS resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
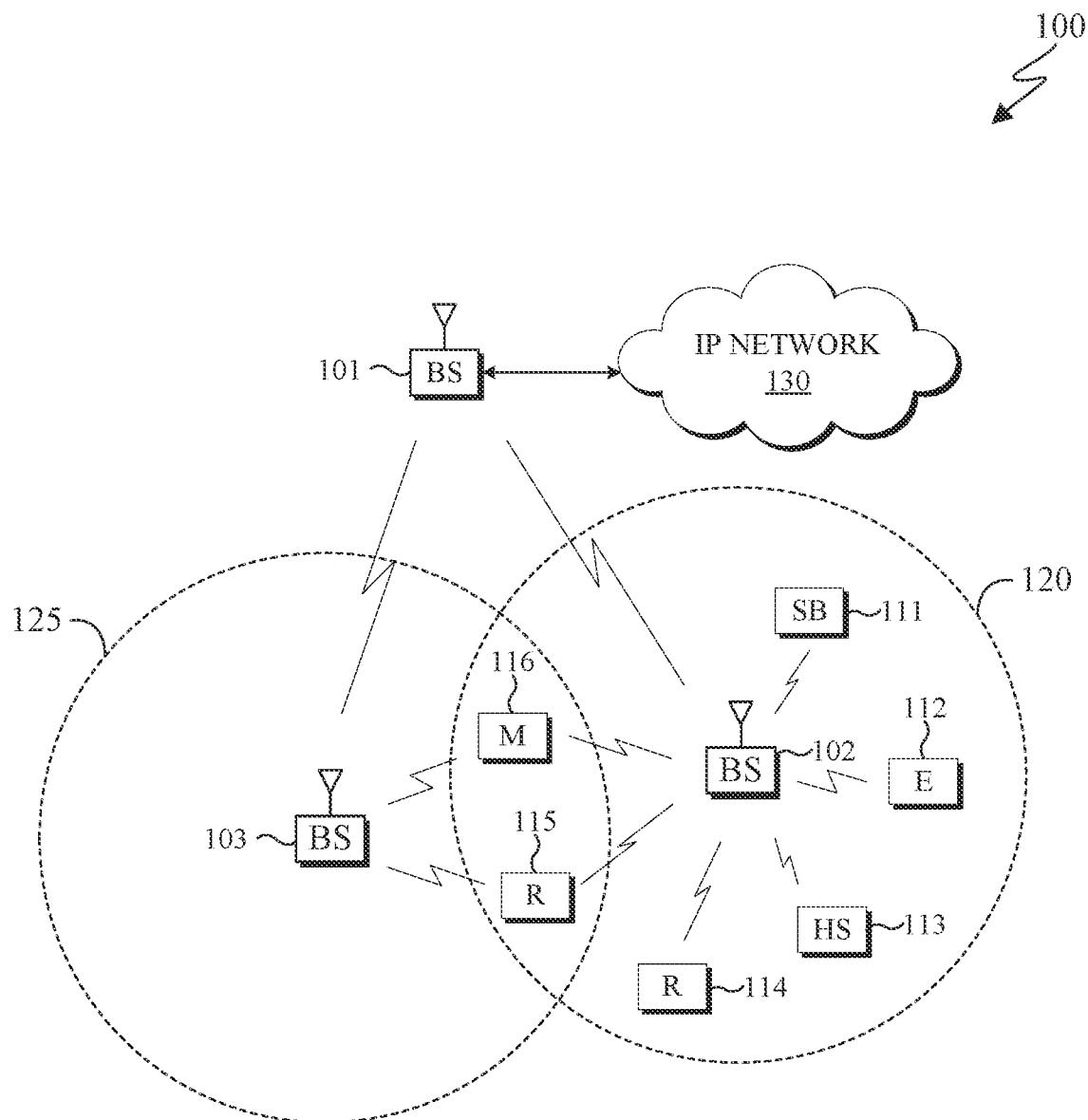
FIG. 1 illustrates an example wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.2.0, "NR; Physical channels and modulation" ("REF 1"), 3GPP TS 38.212 v16.2.0, "NR; Multiplexing and Channel coding" ("REF 2"), 3GPP TS 38.213 v16.2.0, "NR; Physical Layer Procedures for Control" ("REF 3"), 3GPP TS 38.214 v16.2.0, "NR; Physical Layer Procedures for Data" ("REF 4"), 3GPP TS 38.331 v16.1.0, "NR; Radio Resource Control (RRC) Protocol Specification" ("REF 5"), and 3GPP TS 38.321 v16.1.0, "NR; Medium Access Control (MAC) protocol specification" ("REF 6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals.

Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
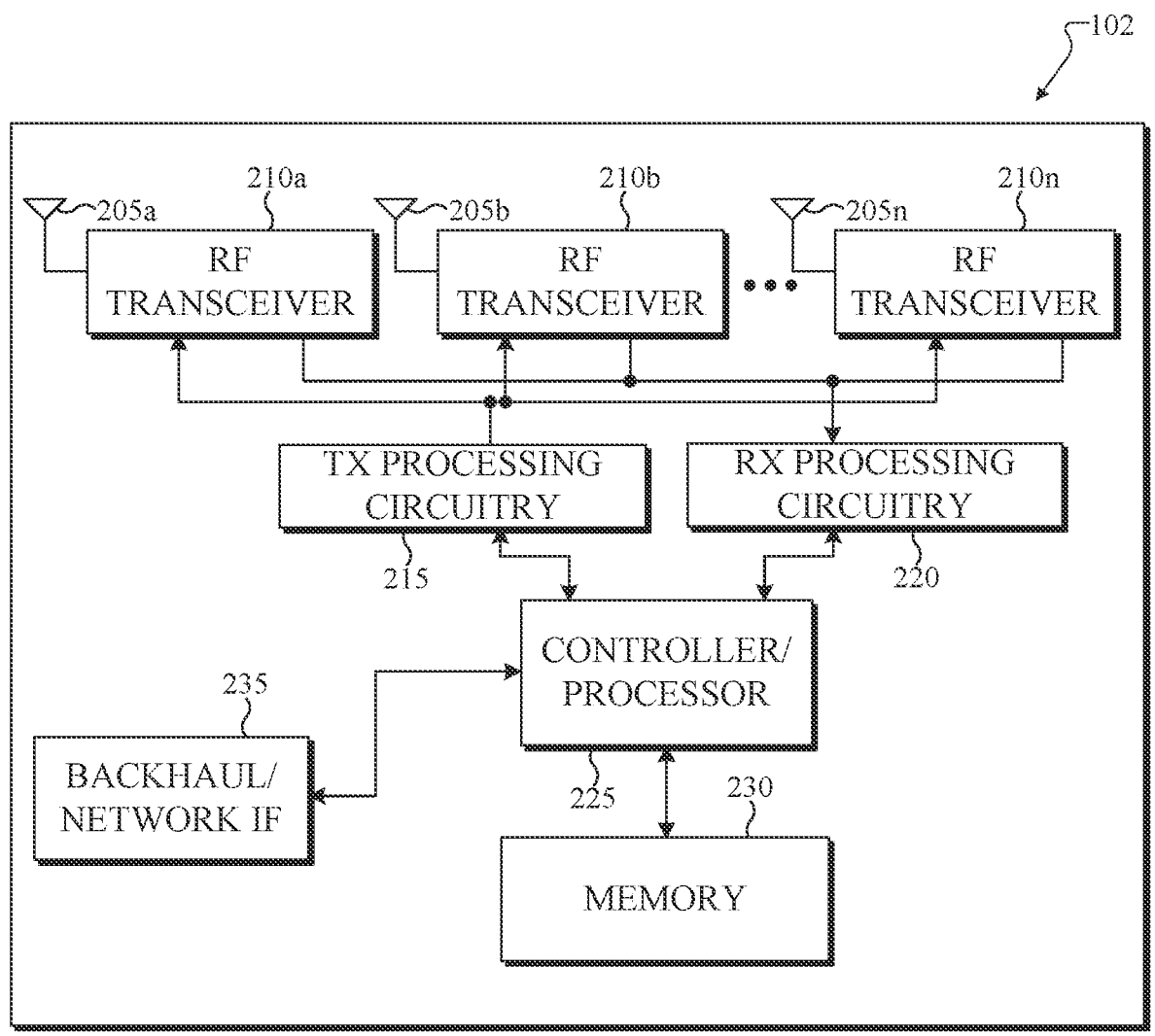
FIG. 2 illustrates an example BS according to embodiments of the present disclosure.
Figure 3:
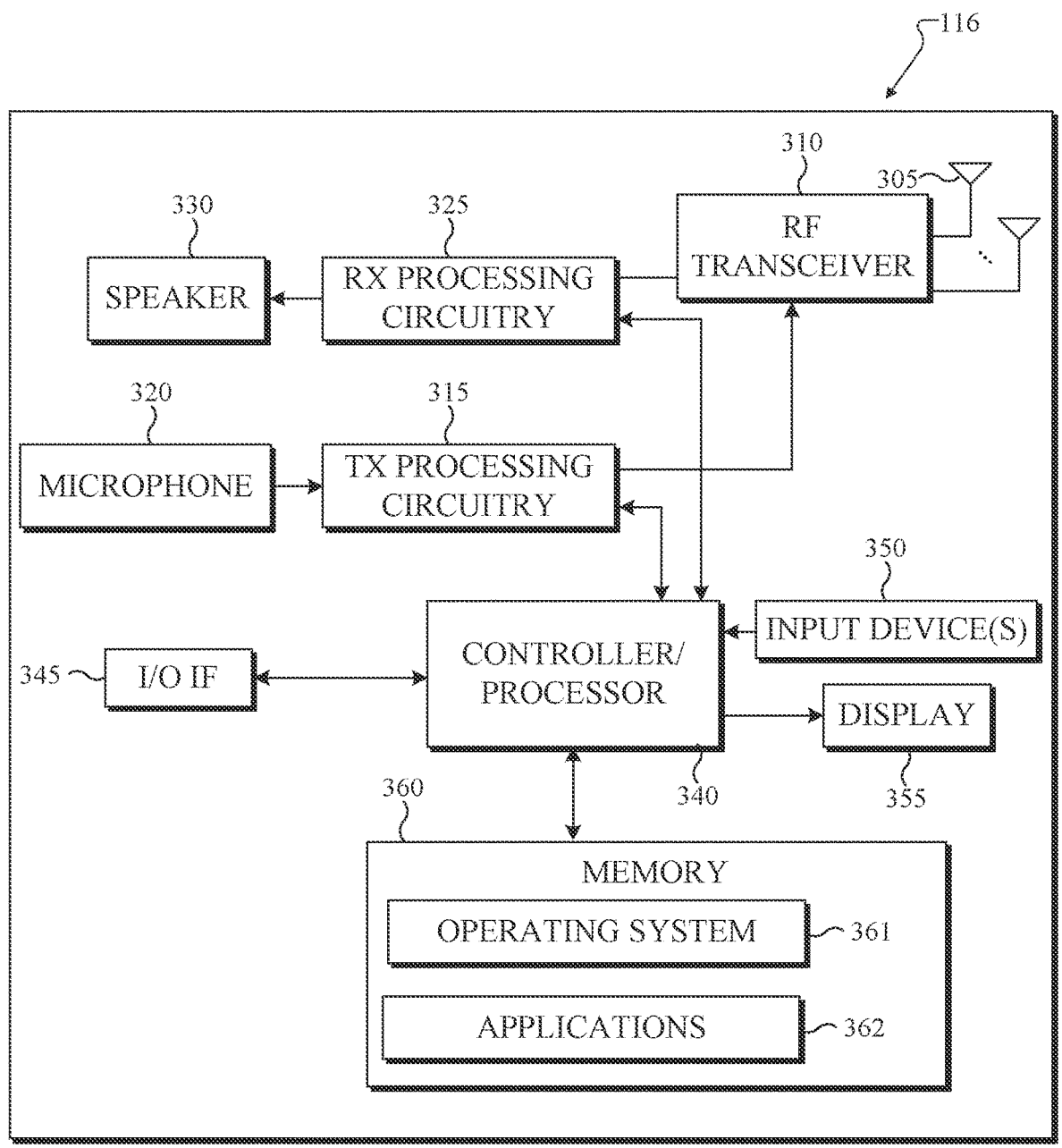
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for receiving information for a UL BWPs of a serving cell and information, for each UL BWP from the set of UL BWPs, for SRS resource sets, determining SRS resources, and transmitting SRS in UL BWPs using the SRS resources. In certain embodiments, and one or more of the BSs 101-103 includes circuitry, programing, or a combination thereof for transmitting information for UL BWPs of a serving cell and information for SRS resource sets to a UE, determining SRS resources, and receiving SRSs in UL BWP using the SRS resources from the UE.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similar, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support transmitting information for UL BWPs of a serving cell and information for SRS resource sets to a UE, determining SRS resources, and receiving SRSs in UL BWP using the SRS resources from the UE. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305. For instance, the controller/processor 340 could support receiving information for UL BWPs of a serving cell and information for SRS resource sets from a BS, determining SRS resources, and transmitting SRS in UL BWPs using the SRS resources to the BS.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
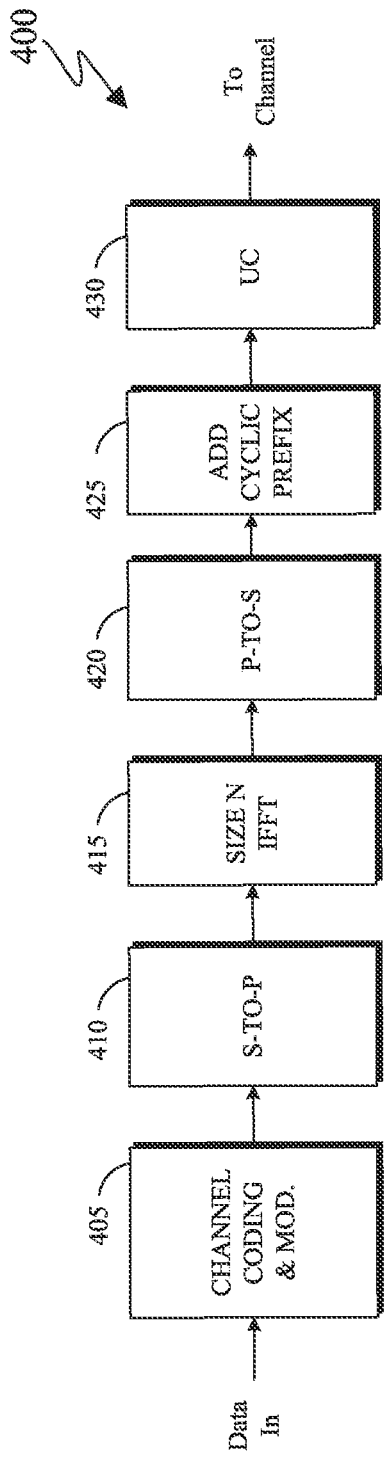
FIGS. 4 and 5 illustrate example wireless transmit and receive paths according to embodiments of the present disclosure.
Figure 5:
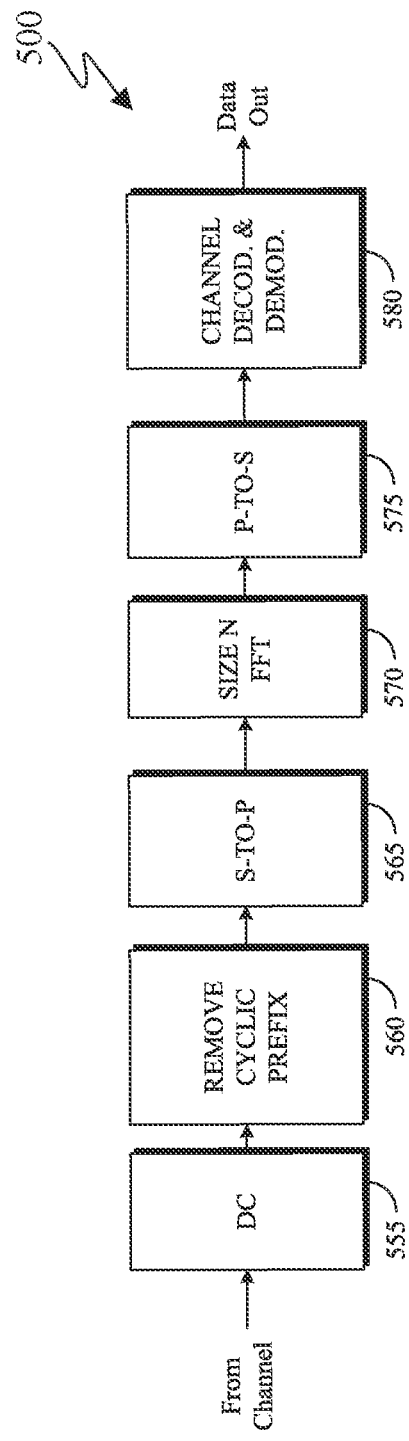

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support multiplexing control or data information with different priority values in a PUSCH as well as multiplexing control information with different priority values in a PUCCH as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding or polar coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similar, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

SRSs are UL physical signals employed by UE for UL channel sounding, including channel quality estimation and synchronization. Unlike demodulation reference signals (DM-RS), SRS are not associated to any physical uplink channels and they support uplink channel-dependent scheduling and link adaptation.

For an aperiodic SRS triggered in DCI format 2_3 and if the UE is configured with higher layer parameter srs-TPC-PDCCH-Group set to 'typeA', and given by SRS-Carrier-Switching, without PUSCH/PUCCH transmission, the order of the triggered SRS transmission on the serving cells follow the order of the serving cells in the indicated set of serving cells configured by higher layers, where the UE in each serving cell transmits the configured one or two SRS resource set(s) with higher layer parameter usage set to 'antennaSwitching' and higher layer parameter resource-Type in SRS-ResourceSet set to 'aperiodic'.

For an aperiodic SRS triggered in DCI format 2_3 and if the UE is configured with higher layer parameter srs-TPC-PDCCH-Group set to 'typeB' without PUSCH/PUCCH transmission, the order of the triggered SRS transmission on the serving cells follow the order of the serving cells with aperiodic SRS triggered in the DCI, and the UE in each serving cell transmits the configured one or two SRS resource set(s) with higher layer parameter usage set to 'antennaSwitching' and higher layer parameter resource-Type in SRS-ResourceSet set to 'aperiodic'.

DCI format 2_3 is used for the transmission of a group of TPC commands for SRS transmissions by one or more UEs. Along with a TPC command, a SRS request may also be transmitted.

The following information is transmitted by means of the DCI format 2_3 with CRC scrambled by TPC-SRS-RNTI: block number 1, block number 2, . . . , block number B, where the starting position of a block is determined by the parameter startingBitOfFormat2-3 or startingBitOfFormat2-3SUL-v1530 provided by higher layers for the UE configured with the block.

If the UE is configured with higher layer parameter srs-TPC-PDCCH-Group=typeA for an UL without PUCCH and PUSCH or an UL on which the SRS power control is not tied with PUSCH power control, one block is configured for the UE by higher layers, with the following fields defined for the block: SRS request—0 or 2 bits. The presence of this field is according to the definition in Clause 11.4 of [5, TS38.213]. If present, this field is interpreted as defined by Table 7.3.1.1.2-24. TPC command number 1, TPC command number 2, . . . , TPC command number N, where each TPC command applies to a respective UL carrier provided by higher layer parameter cc-IndexInOneCC-Set.

If the UE is configured with higher layer parameter srs-TPC-PDCCH-Group=typeB for an UL without PUCCH and PUSCH or an UL on which the SRS power control is not tied with PUSCH power control, one block or more blocks is configured for the UE by higher layers where each block applies to an UL carrier, with the following fields defined for each block: SRS request—0 or 2 bits (The presence of this field is according to the definition in Clause 11.4 of [5, TS38.213]. If present, this field is interpreted as defined by Table 7.3.1.1.2-24) and TPC command—2 bits.

Embodiments of the present disclosure recognize that spectral efficiency can be a limiting factor for deployments of mid-tier UEs that typically require reduced cost and consequently have reduced capabilities (RedCap UEs). One reduced capability is a maximum reception BW. In NR Rel-16, SRS is transmitted within an active UL BWP based on a flexible scheduling and using only portions of the overall channel bandwidth. In order to do channel sounding over entire carrier bandwidth, a UE can be switched to a UL BWP with configured bandwidth equals to the entire carrier bandwidth, and triggered with an aperiodic SRS transmission for the UL BWP. However, this approach doesn't work for mid-tier UEs with maximum operation bandwidth that is smaller than the carrier bandwidth. Without channel sounding over entire carrier bandwidth, NW is not able to switch RedCap UEs to the best UL BWP or narrowband for data transmission.

Embodiments of the present disclosure recognize that congestion is another limiting factor for services require a large number of RedCap UEs, such as wearables. In order to do congestion control, NW has to distribute UEs into multiple BWPs according to real-time channel condition over entire carrier bandwidth.

NR Rel-16 supports SRS carrier-based switching for channel sounding across multiple component carriers (CCs). For the case when the number of carrier supported in the UL is less than the number of carriers supported in the DL, SRS transmission from the UE can be switched in a TDM manner between subsets of carriers in order for the gNB to progressively build up channel estimates for all downlink carriers. Similarly, SRS BWP-based switching for channel sounding over large carrier bandwidth can be considered.

Accordingly, embodiments of the present disclosure recognize that there is a need to support aperiodic SRS transmission between UL BWPs based on a group common DCI format. Embodiments of the present disclosure also recognize that there is another need to support aperiodic SRS transmission between UL BWPs based on a UE-specific DCI format. Embodiments of the present disclosure further recognize that there is yet another need to support periodic/semi-persistent SRS transmission between UL BWPs based on transmission gap.

Various embodiments of the present disclosure provide for aperiodic SRS transmission between UL BWPs triggered by group common DCI format. In these embodiments, aperiodic SRS transmissions in a set of UL BWPs from one or more UEs in a group of UEs that are triggered by a GC-DCI format are provided. The set of UL BWPs can include both active UL BWP and/or non-active UL BWPs.

A gNB can schedule multiple SRS transmissions in respective multiple UL BWPs from a UE by a PDCCH that provides the GC-DCI format. A UE can receive a PDCCH providing the GC-DCI format either based on a UE-specific search space (USS) or based on a common search space (CSS). If the UE receives the PDCCH according to a USS, the UE uses the RNTI for the GC-DCI format for determining locations of corresponding PDCCH candidates instead of using the C-RNTI associated with DCI formats scheduling PDSCH receptions to or PUSCH transmissions from the UE.

In a first example, an RNTI for the GC-DCI format can be same as an RNTI for DCI format 2_3, i.e., TPC-SRS-RNTI for scrambling the CRC bits, where DCI format 2_3 provides TPC commands for, and can additionally trigger, SRS transmissions on multiple cells from a UE. In this case, the GC-DCI format can include an additional one-bit field to indicate whether the contents of the DCI format are for SRS transmissions in a set of UL BWPs of a same cell or in BWPs of different cells. In a second example, the GC-DCI format can use a separate RNTI that can be provided to the UE by higher layers for scrambling the CRC bits of the GC-DCI format. In a third example, DCI format 2_3 can be enhanced to provide TPC commands or triggering of SRS transmissions on both different BWPs of a same cell and on BWPs of different cells.

According to the third example, a UE can be configured a location of a first field in DCI format 2_3 for triggering SRS transmissions in a set of BWPs of a first cell, a location of a second field in DCI format 2_3 for triggering SRS transmissions in a set of BWPs of a second cell, and a location of a third field in DCI format 2_3 for triggering SRS transmissions in BWPs of a set of cells. The index of the first cell can be configured to the UE together with the location of the first field. The location of the second and third fields may not be configured and then follow the location of the first field. The index of the second cell and the indexes of the one or more cells in the set of cells can also be configured to the UE. Variations of the configuration structure can apply, such as rotating the location of the fields so that the third field is the first field and the location for the third field is provided.

In a first approach for aperiodic SRS transmissions among UL BWPs triggered by a GC-DCI format, the GC-DCI format indicates a set of UL BWPs for SRS transmissions per UE. The order of triggered SRS transmission on UL BWPs follows the order of the UL BWPs in the set of UL BWPs as configured by higher layers, or the UL BWP index starting from the smallest index, where on each UL BWP the UE transmits SRS for the configured one or more SRS resource set(s). For example, one or more SRS resource set(s) can have higher layer parameter usage set to 'antennaSwitching' and higher layer parameter resourceType in SRS-ResourceSet set to 'aperiodic'.

Figure 6:
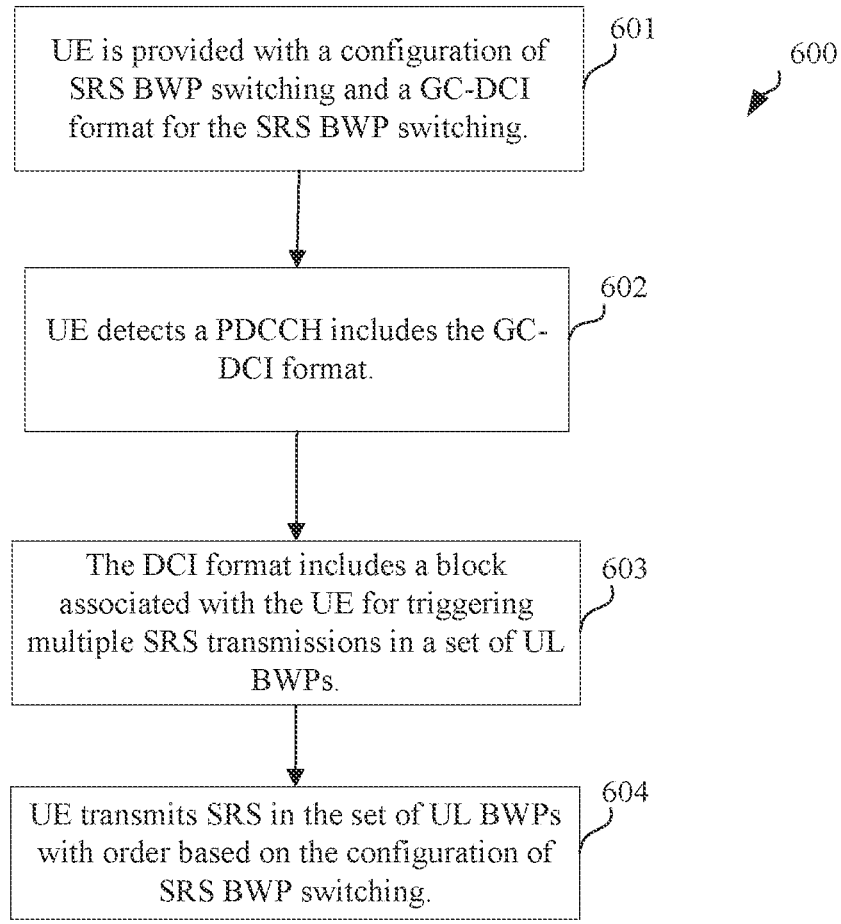
FIG. 6 illustrates an example of a UE procedure for aperiodic SRS transmission between UL BWPs triggered by a group common DCI (GC-DCI) format according to embodiments of the present disclosure.

FIG. 6 illustrates an example of a UE procedure 600 for aperiodic SRS transmission between UL BWPs triggered by a GC-DCI format according to embodiments of the present disclosure. For example, the procedure 600 may be based on the first approach. The UE procedure 600 can be performed by any of the UEs 111-116 of FIG. 1, such as the UE 116 of FIG. 3, and a similar or complementary procedure may be performed by a BS, such as BS 102 of FIG. 2. The UE procedure 600 of FIG. 6 is for illustration only and other embodiments can be used without departing from the scope of the present disclosure.

As illustrated, a UE is provided by higher layers a configuration of SRS BWP switching parameters and a GC-DCI format for triggering the SRS BWP switching (601). The SRS BWP switching parameters can include one or more cells and one or more sets of BWPs per cell for SRS switching and a location of a first field in the GC-DCI format. The UE receives a PDCCH according to a configured search space set and detects the GC-DCI format from the PDCCH reception, 602. The GC-DCI format includes at least one field with a block of information bits for the UE. The block of bits includes at least an indication of an UL BWP set (603). The block of bits can additionally include a cell index or the location of the field providing the block of bits can be associated with a cell index if there are more than one cells where the UE can transmit SRS on a set of BWPs. The UE transmits SRS in the UL BWPs in the indicated set of UL BWP, wherein the order of triggered UL BWP for SRS transmissions is determined by the configuration of the SRS BWP switching or according to the UL BWP index (604).

For determining the configuration of SRS BWP switching based on the first approach for aperiodic SRS transmissions in a set of UL BWPs triggered by a GC-DCI format, the configuration of SRS BWP switching can be provided to the UE by higher layers, and can include at least one of the following:

A list of BWP set indexes, wherein each BWP set includes a number of indexes of UL BWPs for SRS transmissions.

The UL BWP indexes for each BWP set. The UL BWP index can also determine the order of SRS transmissions on the UL BWPs. For example, when a UE is triggered to transmit SRS on a BWP set with index j, the UE transmits SRS in a UL BWP with index i in the BWP set j after transmitting SRS on UL BWP with index (i−1) in the BWP set j. It is also possible that UL BWPs are included in each set in ascending order of their indexes and then an order of SRS transmissions in BWPs from a set of BWPs follow the order of BWP indexes in the set of BWPs.

The GC-DCI format includes $N>=1$ blocks of bits, wherein each of the $N>=1$ blocks is associated with a UE. A UE determines one or more associated block based on a location of a first block. The location of the first block, and the number of consecutive blocks, can be provided to the UE by higher layers. A block of bits can include bits for corresponding fields that indicate one or more of the following:

SRS request. The presence of this field can be default in the block of bits or can be indicated to the UE by higher layers. The size of the SRS request field if configured can be fixed, for example 2 bits, or it can also be indicated by higher layers and can indicate one of the following:

No aperiodic SRS resource set triggered, for example, when the bits of the SRS request field are all "0s".

The index of the set of UL BWPs for SRS transmissions. For example, the SRS field value of v can indicate the v-th set of UL BWPs.

Therefore, an SRS request field can alternatively be viewed as an indicator field of a BWP set for SRS transmissions where an all "0s" value means that no BWP set is indicated.

A configuration of SRS transmission parameters, from a set of configurations of SRS transmission parameters, in the set of BWPs. In case the set includes only one configuration of SRS transmission parameters, a corresponding indication by the GC-DCI format is not needed. The configuration of SRS transmission parameters can be applied to all applicable UL BWPs for SRS transmissions. For example, the UE can be provided with multiple configurations of SRS transmission parameters for each applicable UL BWP, and a common DCI field indicates an index of one configuration out from the multiple configurations for each of the applicable UL BWPs $M>=1$ TPC commands, where the i-th TCP command applies to the i-th UL BWP in the triggered UL BWP set. M is the maximum number of UL BWPs in the sets of UL BWPs configured to the UE for SRS BWP switching. The size of TPC command can be fixed, for example 2 bits. Alternatively, as an SRS transmission across BWPs of a same cell experiences correlated fading, a single TPC command can be provided (M=1) and be applicable for all BWPs in the set of BWPs indicated for SRS transmission from the UE.

Figure 7:
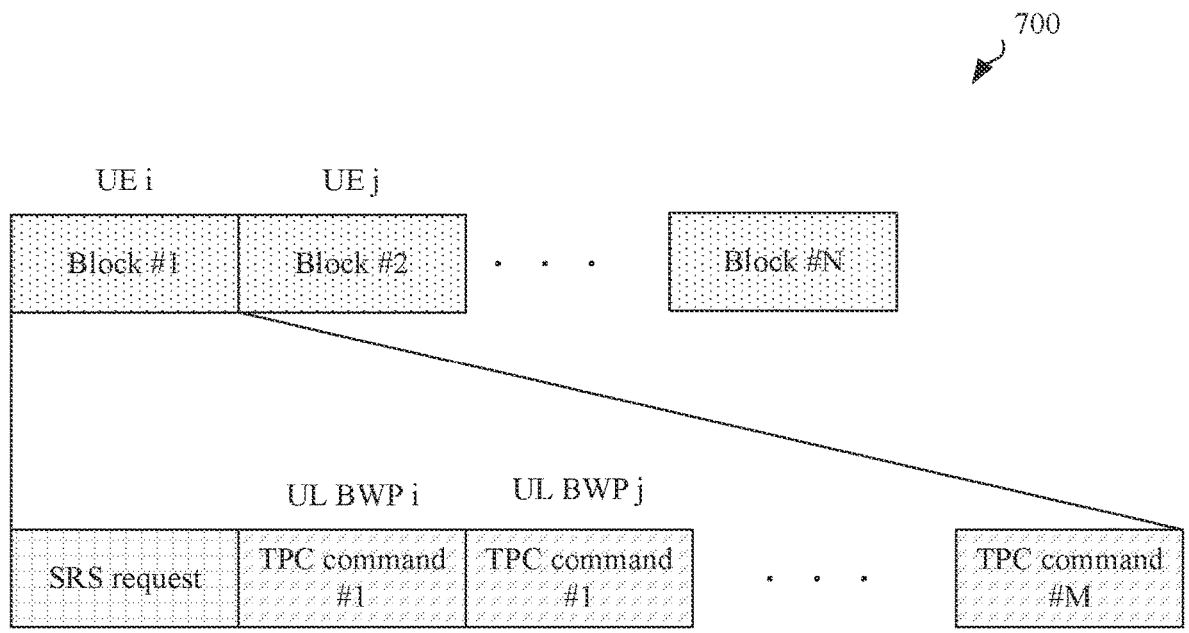
FIG. 7 illustrates an example of contents of the GC-DCI format for aperiodic SRS transmissions in a set of UL BWPs according to embodiments of the present disclosure.

FIG. 7 illustrates an example of contents of the GC-DCI format 700 for aperiodic SRS transmissions in a set of UL BWPs according to embodiments of the present disclosure. For example, the contents of the GC-DCI format 700 may be based on the first approach for aperiodic SRS transmissions in a set of UL BWPs. The example of contents of the GC-DCI format 700 of FIG. 7 is for illustration only and other embodiments can be used without departing from the scope of the present disclosure.

As illustrated in FIG. 7, a UE is configured with one block, where the block consists of a common SRS request for all UL BWPs in the indicated UL BWP set, and M TCP commands, and each of the TPC command applies to a respective UL BWP in the triggered UL BWP set. For M=1, a same TPC command applies to all BWPs in the indicated set of BWPs.

In a second approach for aperiodic SRS transmissions in a set of BWPs where the SRS transmissions are triggered by a GC-DCI format, the GC-DCI format includes multiple SRS request fields per UE, where each value of the SRS request field triggers an SRS transmission from a UE in a corresponding UL BWP. For example, for a UE with 4 configured UL BWPs where one of the 4 UL BWPs is an active UL BWP, an SRS request field of 2 bits can indicate no SRS transmission, or SRS transmission in a first, second, or third of the 4 UL BWPs other than the active UL BWP. For example, for a UE with 4 configured UL BWPs where one of the 4 UL BWPs is an active UL BWP, an SRS request field of 2 bits can indicate no SRS transmission, or SRS transmission in a first, second, or third of the 4 UL BWPs that have a larger size (that is, exclude from indication a BWP, from the 4 BWPs, with the smallest size). This can be preferable in case the BWP with the smallest size is included in one of the BWPs with a larger size. For another example, a block location, such as starting position, is provided for each UL BWP that is configured for BWP based SRS switching. The order of the triggered SRS transmission on the UL BWPs follows the order of the UL BWP with aperiodic SRS triggered in the GC-DCI format.

Figure 8:
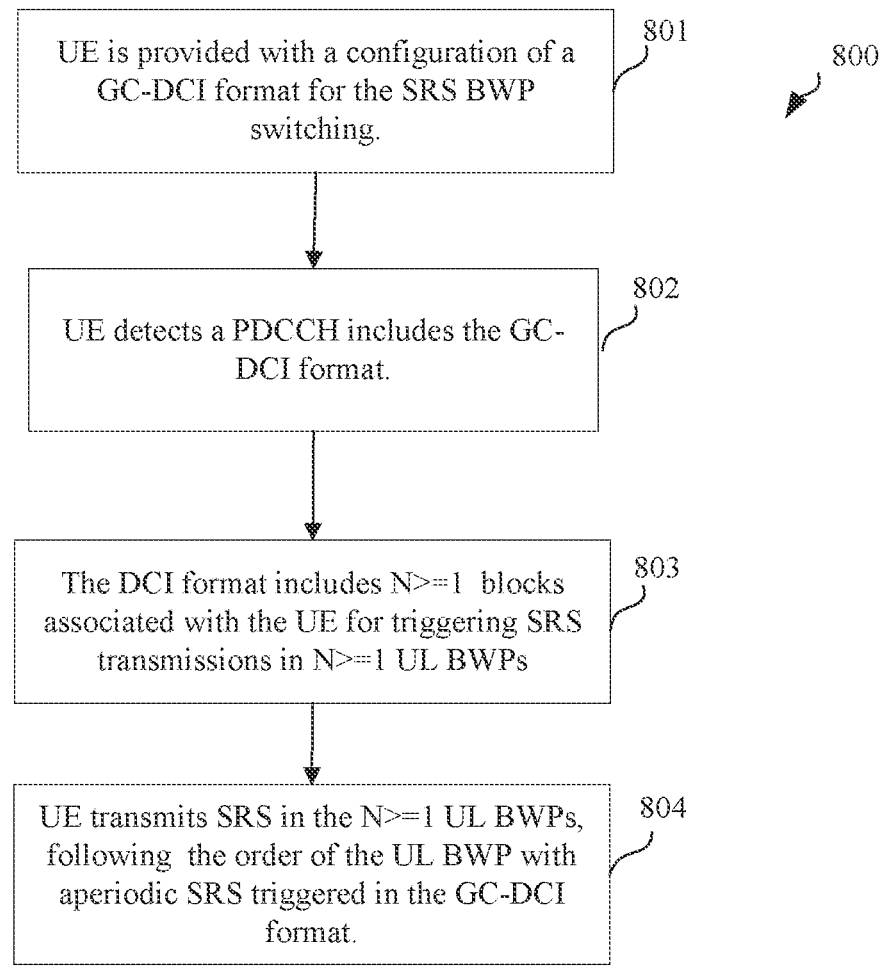
FIG. 8 illustrates an example of a UE procedure for aperiodic SRS transmissions in a set of UL BWPs where the SRS transmissions are triggered by a GC-DCI format according to embodiments of the present disclosure.

FIG. 8 illustrates an example of a UE procedure 800 for aperiodic SRS transmissions in a set of UL BWPs where the SRS transmissions are triggered by a GC-DCI format according to embodiments of the present disclosure. For example, for a UE procedure 800 the SRS transmissions may be triggered by a GC-DCI format based on the second approach. The UE procedure 800 can be performed by any of the UEs 111-116 of FIG. 1, such as the UE 116 of FIG. 3, and a similar or complementary procedure may be performed by a BS, such as BS 102 of FIG. 2. The UE procedure 800 of FIG. 8 is for illustration only and other embodiments can be used without departing from the scope of the present disclosure.

As shown in FIG. 8, a UE is provided by higher layers with a configuration of a GC-DCI format for triggering BWP based SRS switching (801). The UE receives a PDCCH that includes the GC-DCI format in a configured search space set and detects the GC-DCI format (802). The GC-DCI format includes N>=1 blocks associated with the UE, wherein each block includes indication for triggering aperiodic SRS in an UL BWP (803). The UE can determine the order of the triggered SRS transmission on the N>=1 UL BWPs based on the order of the UL BWP with aperiodic SRS triggered in the GC-DCI format, and transmits SRS in N>=1 UL BWPs (804).

For determining the content of the GC-DCI format switching based on the second approach for aperiodic SRS transmissions in a set of UL BWPs, the GC-DCI format includes N>=1 blocks. A UE can be configured with one or more blocks from the N>=1 blocks by higher layers. For example, a location of bits for a first block in the GC-DCI format is provided by higher layers to the UE for a first UL BWP that is configured for BWP-based SRS switching and bits for other blocks can follow the bits for the first block. For another example, a location of bits for a block in the GC-DCI format is provided by higher layers to the UE for each UL BWP that is configured for BWP-based SRS switching. Each block applies to an UL BWP and the following fields defined for each block:

SRS request. An indication for a presence or absence of this field can be indicated to a UE by higher layers. The size of the SRS request field if configured can be fixed, for example 1 bit or 2 bits. If the SRS request field is present, the SRS request field can indicate any of the following:
  No aperiodic SRS resource set triggered for SRS transmission, for example, when the bits of the SRS request field are all "0s".
  An SRS resource set(s) for SRS transmission. The value of the SRS field indicates an index of the SRS resource set for SRS transmission. For example, the SRS field value of v indicate the SRS resource set(s) with higher layer parameter configured with higher layer parameter periodicSRS-ResourceTrigger set to v.
TPC command. The size of the TCP command field can be fixed, for example 2 bits. Alternatively, as an SRS transmission across BWPs of a same cell experiences correlated fading, a single TPC command can be provided and be applicable for all BWPs in the set of BWPs. The signal TCP command can be located right before or after the list of the blocks.

In another method to determine the power for SRS transmissions across multiple UL BWPs, the UE can be provided with a TPC command in another DCI format, that is different from the GC-DCI format triggers the SRS transmissions. For example, the UE assumes the TPC command is provided by a DCI format that schedules a PUSCH transmission in active UL BWP.

Figure 9:
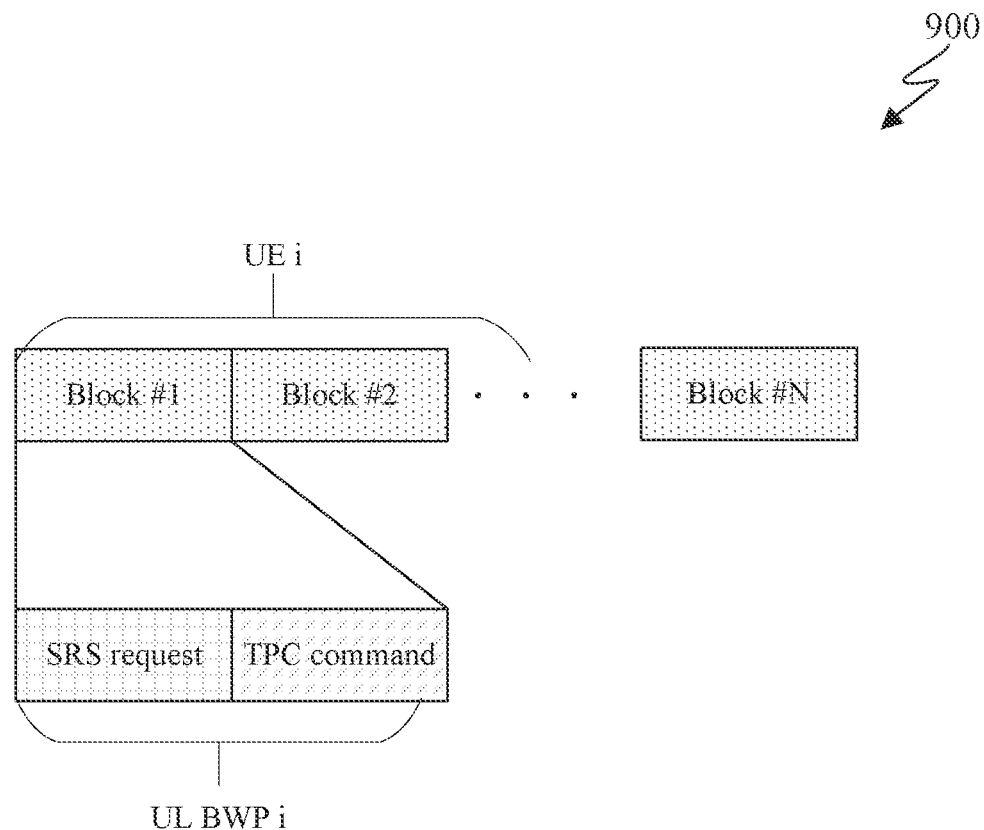
FIG. 9 illustrates an example of contents of a GC-DCI format for aperiodic SRS transmission in a set of UL BWPs according to embodiments of the present disclosure.

FIG. 9 illustrates an example of contents of a GC-DCI format 900 for aperiodic SRS transmission in a set of UL BWPs according to embodiments of the present disclosure. For example, the contents of the GC-DCI format 900 may be based on the second approach for aperiodic SRS transmission in a set of UL BWPs. The example of contents of the GC-DCI format 900 of FIG. 9 is for illustration only and other embodiments can be used without departing from the scope of the present disclosure.

As illustrated in FIG. 9, a UE is configured with one or more blocks of bits, where each of the configured blocks of bits can include bits for an SRS request field for triggering aperiodic SRS transmission in an associated UL BWP configured to the UE and a TCP command field for providing a TPC command to adjust a power for the SRS transmission in the indicated UL BWP.

For determining a payload size of a GC-DCI format triggering BWP-based SRS switching, the payload size of the GC-DCI format can be provided to the UE by higher layers. For example, the GC-DCI payload size can have a same size as a payload size of a DCI format with CRC scrambled by a C-RNTI scheduling PDSCH/PUSCH to a UE, in case the UE monitors PDCCH for detection of the GC-DCI format according to a CSS, or a same size as a payload size.

When a UE supports both the first approach and the second approach for BWP-based SRS switching triggered by a GC-DCI format, a higher layer parameter can be provided to the UE to indicate which type of approach is activated or selected.

For n-th (n≥1) aperiodic SRS transmission on a BWP b, upon detection of a positive SRS request on a grant/DCI format, the UE shall commence this SRS transmission on the configured symbol and slot provided:
  it is no earlier than the summation of:
    the maximum time duration between the two durations spanned by X OFDM symbols of the numerology of BWP b and the BWP carrying the grant respectively, and
    the BWP switching delay, T0
  it does not collide with any previous SRS transmissions, or interruption due to BWP switching delay
otherwise, n-th SRS transmission is dropped, where X is the reported capability as the minimum time interval in unit of symbols, between the DCI triggering and aperiodic SRS transmission. T0 can be either provided by higher layers or reported by UE.

If the UE receives the DCI triggering aperiodic SRS in slot n, the UE transmits aperiodic SRS in each of the triggered SRS resource set(s) in slot $$\left\lfloor n \cdot \frac{2^{\mu_{SRS}}}{2^{\mu_{PDCCH}}} \right\rfloor + k + \left[ \left( \frac{N_{slot,offset,PDCCH}^{BWP}}{2^{\mu_{offsetPDCCH}}} - \frac{N_{slot,offset,SRS}^{BWP}}{2^{\mu_{offset,SRS}}} \right) \cdot 2^{\mu_{SRS}} \right],$$

where:
  k is configured via higher layer parameter slotOffset for each triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the triggering command respectively;
  $N_{slot,offset,PDCCH}^{BWP}$ and $\mu_{offset,PDCCH}$ are slot offset for BWP based SRS switching and corresponding subcarrier spacing configured by higher layers for the BWP receiving the PDCCH, $N_{slot,offset,PDCCH}^{BWP}$ and $\mu_{offset,PDCCH}$ are slot offset for BWP based SRS switching and corresponding subcarrier spacing configured by higher layers for the BWP transmitting the SRS.

In a third approach for aperiodic SRS transmissions in a set of BWPs, a UE is provided a location of an SRS request field in a GC-DCI format. A size of the SRS request field can be predetermined in the system operation of can be provided by higher layers. A TPC command field can also be provided, and corresponding bits can follow the bits for the SRS request field. It is also possible that the order of bits is reversed, the location is for the TPC command field, and a UE is indicated by higher layers whether or not there is an SRS request field following the TPC command field. If an SRS request field is included in the GC-DCI format, a value of the SRS request field triggering an SRS transmission can map to a configuration, from a number of configurations for SRS transmission provided by higher layers, that includes a bandwidth for the SRS transmission. The bandwidth of the SRS transmission can include, fully or partially, multiple BWPs including all BWPs that are configured to the UE on a cell. If an SRS request field is not included in the GC-DCI format, higher layer can configure a bandwidth of the SRS transmission to include, fully or partially, multiple of the BWPs that are configured to the UE.

Various embodiments of the present disclosure provide for aperiodic SRS transmission between UL BWPs triggered by UE-specific DCI format. Various embodiments provide aperiodic SRS transmissions in a set of UL BWPs from a UE wherein the aperiodic SRS transmissions are triggered by a UE-specific DCI format that is defined as a DCI format with CRC bits scrambled by a C-RNTI, or a CS-RNTI, or an MCS-C-RNTI. The UL BWPs can include both active UL BWP and/or non-active UL BWPs.

In a first approach for aperiodic SRS transmissions in a set of UL BWPs that are triggered by a UE-specific DCI format, the DCI format includes an SRS request field for indicating a set of UL BWPs for the SRS transmissions. The order of the SRS transmissions on UL BWPs in the set of UL BWPs can follows the order of the UL BWPs in the indicated set of UL BWPs where the UE on each UL BWP transmits SRS for the configured one or more SRS resource set(s), as configured by higher layers, or can follow the order of the UL BWP index. For example, the one or more SRS resource set(s) have higher layer parameter usage set to 'antennaSwitching' and higher layer parameter resourceType in SRS-ResourceSet set to 'aperiodic'.

Figure 10:
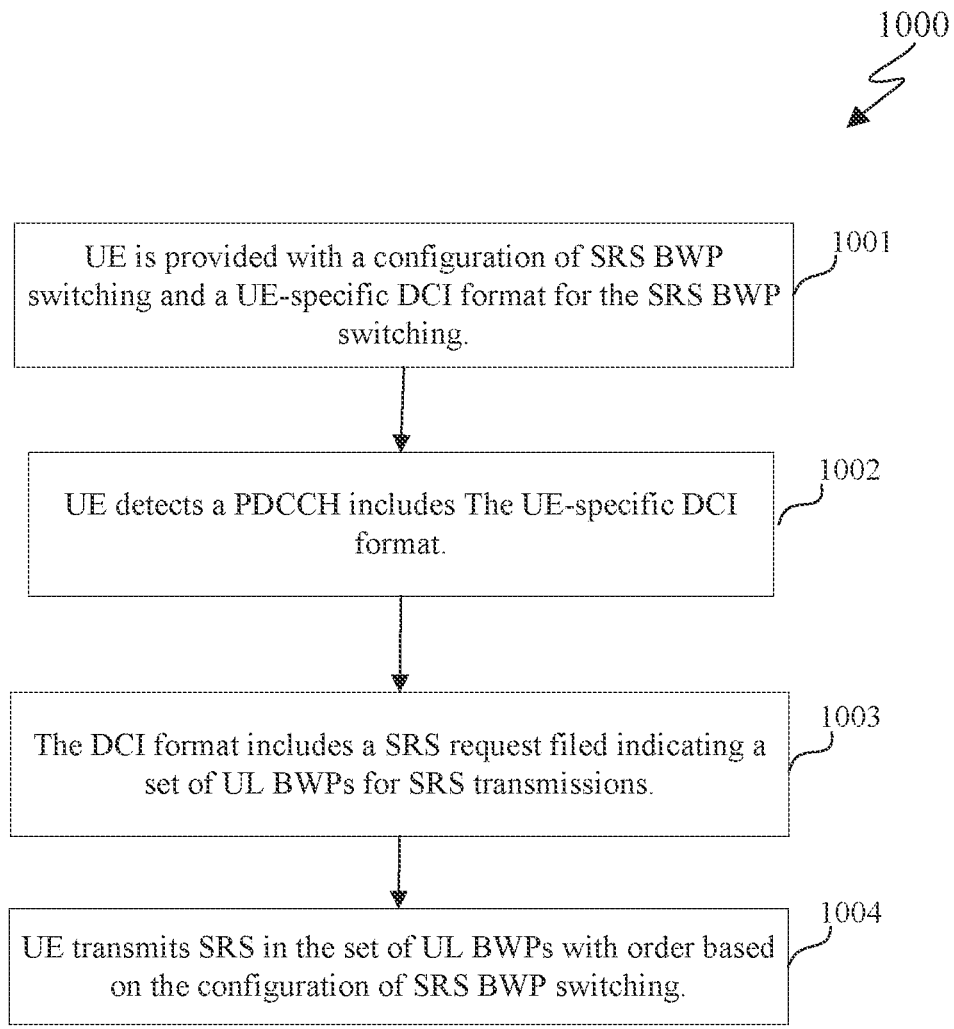
FIG. 10 illustrates an example of a UE procedure for aperiodic SRS transmissions in a set of UL BWPs where the SRS transmissions are triggered by a UE-specific DCI format according to embodiments of the present disclosure.

FIG. 10 illustrates an example of a UE procedure 1000 for aperiodic SRS transmissions in a set of UL BWPs where the SRS transmissions are triggered by a UE-specific DCI format according to embodiments of the present disclosure. For example, the SRS transmissions may be triggered by a UE-specific DCI format based on the first approach. The UE procedure 1000 can be performed by any of the UEs 111-116 of FIG. 1, such as the UE 116 of FIG. 3, and a similar or complementary procedure may be performed by a BS, such as BS 102 of FIG. 2. The example UE procedure 1000 of FIG. 10 is for illustration only and other embodiments can be used without departing from the scope of the present disclosure.

As shown in FIG. 10, a UE is provided by higher layers with a configuration of SRS BWP switching and a configuration for an SRS request field for triggering SRS BWP switching in a UE-specific format (1001). The UE receives a PDCCH that includes the UE-specific DCI format in a configured search space set and detects the DCI format (1002). The DCI format includes an SRS request field that indicate a set of UL BWPs for SRS transmissions (1003). The UE transmits the SRS in UL BWPs from the indicated UL BWP set (1004). An order of SRS transmissions in the UL BWP can follow the order of the UL BWPs in the set of UL BWPs or can be in an ascending order of an UL BWP index.

A configuration of SRS BWP switching can be provided to the UE by higher layers and can include at least one of the following: a list of BWP set indexes, wherein each BWP set index indicates a set of UL BWPs for SRS transmissions.

An UL BWP index in a respective BWP set. The UL BWP index can also determine the order of SRS transmissions on the UL BWPs in a set of UL BWPs that is indicated by an SRS trigger in the UE-specific DCI format. For example, when a UE is triggered to transmit SRS on a BWP set with index j, the UE transmits SRS in a UL BWP with index i in the BWP set j after transmitting SRS on UL BWP with index (i−1) in the BWP set j.

A presence or absence of a SRS request field triggering aperiodic SRS transmissions in BWPs in a set of BWPs can be indicated to a UE by higher layers. A size of the SRS request field, if configured, can be fixed, for example 2 bits, or can be provided by higher layers either explicitly or implicitly as a logarithm of base 2 of a number of corresponding configurations for SRS transmissions that can be indicated by the SRS request field. If the SRS request field is present, it can indicate any of the following:

No aperiodic SRS resource set triggered, for example, when the bits of the SRS request field are all "0s".

An index of an UL BWP set for SRS transmissions. For example, an SRS field value of v indicates the v-th set of UL BWPs for SRS transmissions as configured by higher layers.

For determining a TPC command for computing a power of SRS transmissions on UL BWPs in a set of UL BWPs indicated by an SRS request field in a UE-specific DCI format, when only one TPC command field is included in the UE-specific DCI format, the UE applies the TPC command provided by a value of the field for all SRS transmissions. Alternatively, a UE can be configured by higher layers with two TPC commands in the UE-specific DCI format, where one TPC command is applicable for PUCCH or PUSCH scheduled by the UE-specific DCI format, and the other TPC command is applicable for SRS transmissions on the BWPs in an indicated set of UL BWPs. The DCI format to provide information for the TPC command for SRS transmissions can be different from the DCI format that triggers the SRS transmissions.

It is also possible that a SRS request field for SRS transmissions with BWP switching is separate from a SRS request field for SRS transmissions within an active BWP, or a single SRS request field applies both for triggering SRS transmissions within an active BWP and for triggering SRS transmissions on BWPs in a set of BWPs, where a first set of values for the SRS request field can be associated with the former SRS triggering and a second set of values can be associated with latter SRS triggering. One or more sets of BWPs can be configured by higher layers, or SRS triggering in a set of BWPs can include all configured UL BWPs. A set of BWPs can either include the active BWP or the active BWP can be excluded from all sets of BWPs. A TPC command value can be applicable for determining an SRS transmission power on all BWPs in the a of BWPs that is indicated by a SRS request field for SRS transmissions.

In a second approach for aperiodic SRS transmissions on BWPs in a set of UL BWPs, wherein the SRS transmissions are triggered by a UE-specific format, the UE-specific format includes multiple SRS request fields, wherein each SRS request field triggers an aperiodic SRS transmission from a UE in one UL BWP. For example, a SRS request field location is provided per UL BWP. The order of the triggered SRS transmission on the UL BWPs follows the order of the UL BWP with aperiodic SRS triggered in the UE-specific format.

Figure 11:
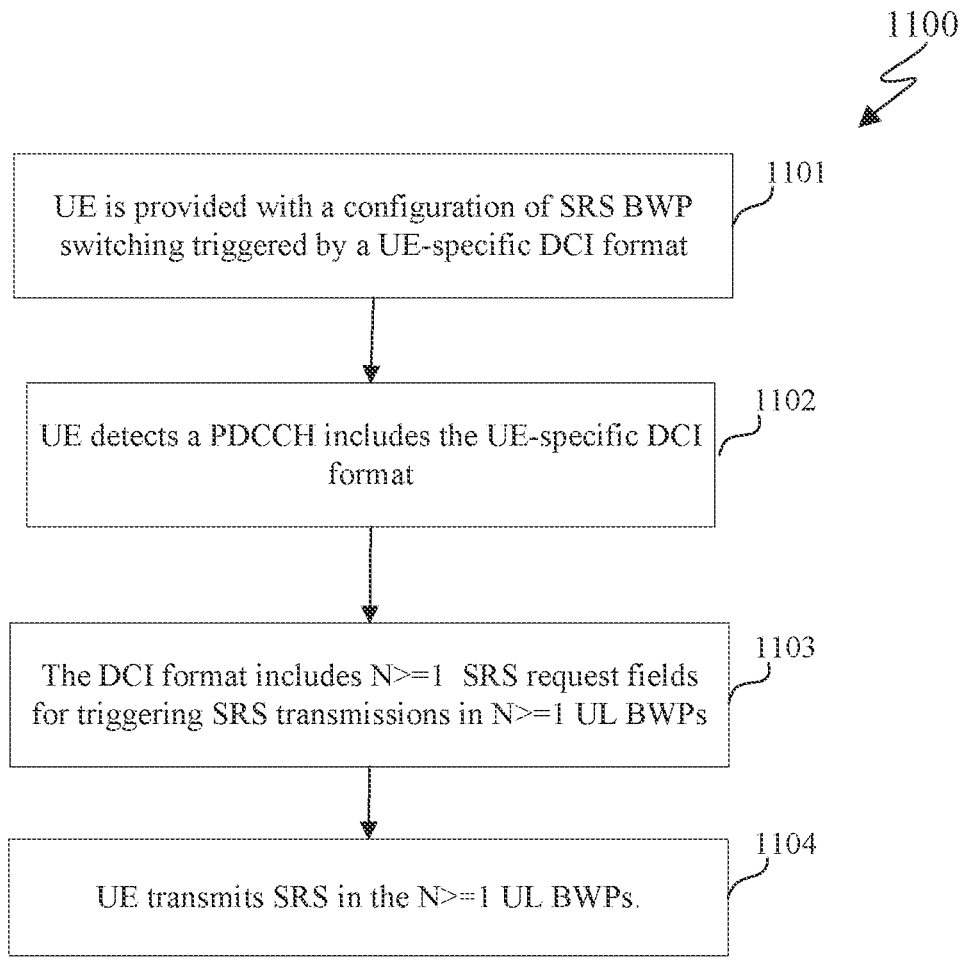
FIG. 11 illustrates an example of a UE procedure for aperiodic SRS transmissions on multiple UL BWPs where the SRS transmissions are triggered by a UE-specific DCI format according to embodiments of the present disclosure.

FIG. 11 illustrates an example of a UE procedure 1100 for aperiodic SRS transmissions on multiple UL BWPs where the SRS transmissions are triggered by a UE-specific DCI format according to embodiments of the present disclosure. For example, the SRS transmissions may be triggered by a UE-specific DCI format based on the second approach. The UE procedure 1100 can be performed by any of the UEs 111-116 of FIG. 1, such as the UE 116 of FIG. 3, and a similar or complementary procedure may be performed by a BS, such as BS 102 of FIG. 2. The example UE procedure 1100 of FIG. 11 is for illustration only and other embodiments can be used without departing from the scope of the present disclosure.

As shown in FIG. 11, a UE is provided by higher layers with a configuration of SRS BWP switching triggered by a SRS request field in a UE-specific DCI format (1101). The UE receives a PDCCH that includes the UE-specific DCI format in a configured search space set and detects the DCI format (1102). The DCI format includes N>=1 SRS request field, wherein each SRS request field includes indication for triggering aperiodic SRS in an UL BWP (1103). In case of a single SRS request field (N=1), a first value of the SRS request field can indicate SRS transmission in a first UL BWP, such as an active BWP, and a second value of the SRS request field can indicate SRS transmission in a second UL BWP, such as a non-active BWP. A BWP can be mapped to more than one values of the SRS request field and then different corresponding values can indicate different configuration for an SRS transmission in the BWP.

A UE can be configured with N>=1 SRS request fields by higher layers. In one example, a starting position of an SRS request field is provided to the UE per UL BWP that is configured for BWP based SRS switching. In another example, the start of SRS request field is predetermined, and the UE is provided with an index of the associated SRS request field for each UL BWP that is configured with SRS BWP switching.

For determining a TPC command for computing a power for an SRS transmission based on the second approach for aperiodic SRS transmissions, when only one TPC command field is included in the UE-specific DCI format, the UE applies the indicated value for the TPC command for the SRS transmission on a corresponding UL BWP and for the PUCCH or PUSCH scheduled by the DCI format. Alternatively, a UE can be configured by higher layers with two TPC command fields, or a TPC command field providing 2 TPC command values, in the UE-specific DCI format, where one TPC command value is applicable for a PUCCH or PUSCH transmission scheduled by the UE-specific DCI format, and the other TPC command value is applicable for SRS transmission on a BWP indicated by the SRS request field.

When a UE supports both the first approach and the second approach for BWP based SRS switching triggered by a UE-specific DCI format, a higher layer parameter can be provided to the UE to indicate which type of approach is activated or selected. For n-th (n>1) aperiodic SRS transmission on a BWP b, upon detection of a positive SRS request on a grant, the UE shall commence this SRS transmission on the configured symbol and slot provided:

it is no earlier than the summation of:
  the maximum time duration between the two durations spanned by X OFDM symbols of the numerology of BWP b and the BWP carrying the grant respectively, and
  the BWP switching delay, T0, and
it does not collide with any previous SRS transmissions, or interruption due to BWP switching delay, otherwise, n-th SRS transmission is dropped, where X is the reported capability as the minimum time interval in unit of symbols, between the DCI triggering and aperiodic SRS transmission. T0 can be either provided by higher layers or reported by UE.

If the UE receives the DCI triggering aperiodic SRS in slot n, the UE transmits aperiodic SRS in each of the triggered SRS resource set(s) in slot $$\left\lfloor n \cdot \frac{2^{\mu_{SRS}}}{2^{\mu_{PDCCH}}} \right\rfloor + k + \left\lfloor \left( \frac{N_{slot,offset,PDCCH}^{BWP}}{2^{\mu_{offset,PDCCH}}} - \frac{N_{slot,offset,SRS}^{BWP}}{2^{\mu_{offset,SRS}}} \right) \cdot 2^{\mu_{SRS}} \right\rfloor,$$

where
  k is configured via higher layer parameter slotOffset for each triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the triggering command respectively;
  $N_{slot,offset,PDCCH}^{BWP}$ and $\mu_{offset,PDCCH}$ are slot offset for BWP based SRS switching and corresponding subcarrier spacing configured by higher layers for the BWP receiving the PDCCH, $N_{slot,offset,PDCCH}^{BWP}$ and $\mu_{offset,PDCCH}$ are slot offset for BWP based SRS switching and corresponding subcarrier spacing configured by higher layers for the BWP transmitting the SRS.

Various embodiments of the present disclosure provide for periodic/semi-persistent SRS transmission between UL BWPs based on transmission gap. Various embodiments of this disclosure provide periodic/semi-persistent SRS transmissions on UL BWPs in a set of UL BWPs from a UE based on configured transmission gap. The UL BWPs can include both an active UL BWP and/or non-active UL BWPs. In one example, active UL BWP is not included for SRS transmission within a measurement gap. A UE can be provided by higher layers with a transmission gap for transmitting periodic/semi-persistent SRS in multiple UL BWPs. The transmission gap is denoted as SRS-TG in this disclosure for brevity.

Figure 12:
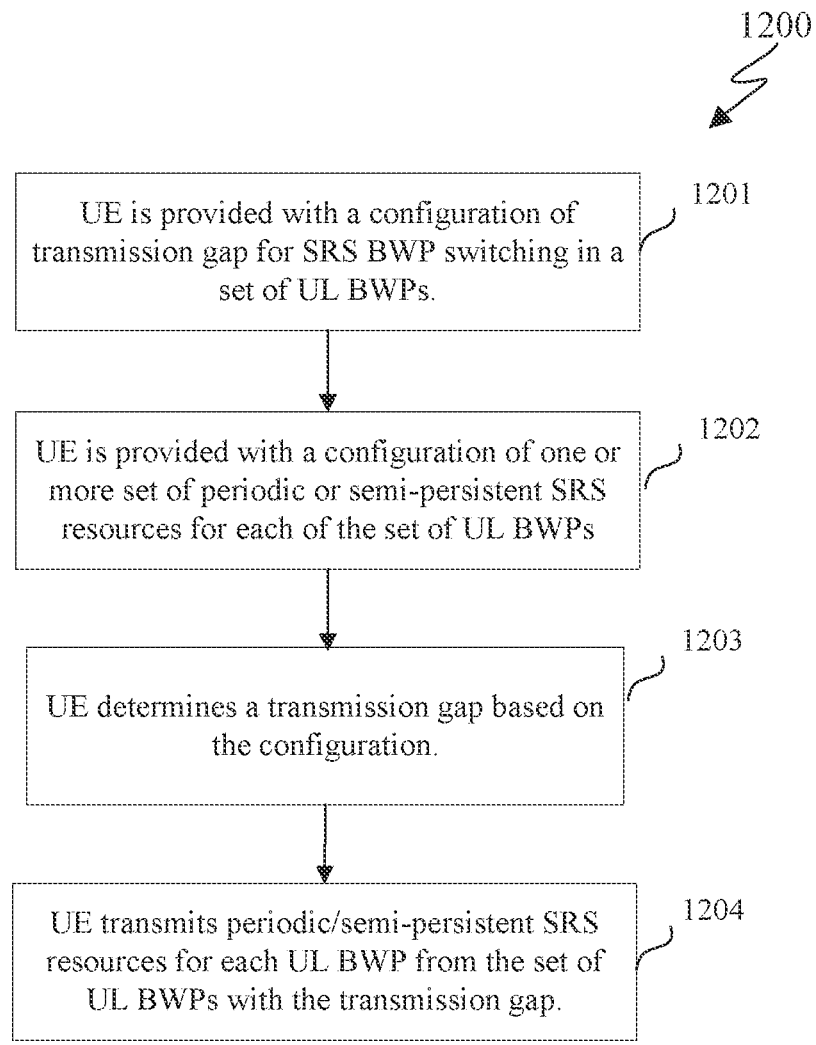
FIG. 12 illustrates an example of a UE procedure for SRS transmissions on UL BWPs based on a transmission gap according to embodiments of the present disclosure.

FIG. 12 illustrates an example of a UE procedure 1200 for SRS transmissions on UL BWPs based on a transmission gap according to embodiments of the present disclosure. The UE procedure 1200 can be performed by any of the UEs 111-116 of FIG. 1, such as the UE 116 of FIG. 3, and a similar or complementary procedure may be performed by a BS, such as BS 102 of FIG. 2. The UE procedure 1200 of FIG. 12 is for illustration only and other embodiments can be used without departing from the scope of the present disclosure.

As illustrated in FIG. 12, a UE can be provided with a configuration of transmission gap for BWP-based SRS switching in a set of UL BWPs (1201). The UE is also provided with a configuration of one or more set of periodic or semi-persistent SRS resources for each of the set of UL BWPs (1202). The UE determines a transmission gap based on the configuration (1203). The UE transmits the periodic or semi-persistent SRS on SRS resources for each of the set of UL BWPs within the determined transmission gap (1204).

An SRS-TG configuration can include a transmission gap length, denoted as tgl, that indicates a duration or length of a transmission gap, for example in the unit of one millisecond or one slot. An SRS-TG configuration can include a transmission gap repetition period, denoted as tgrp, that indicates a periodicity, for example in the unit of one millisecond or one slot, at which the transmission gap repeats. An SRS-TG configuration can include a transmission gap offset, denoted as gapOffset, for example in the unit of one millisecond or one slot, that is an offset of the gap pattern with transmission gap repetition period determined by mrgp. A value range of gapOffset is from 0 to tgrp−1. An SRS-TG configuration can be activated or deactivated based on signalling from higher layers.

An SRS-TG configuration can include a TPC command to determine the transmission power for SRS transmission within the TG. Alternatively, a UE can determine the transmission power for SRS transmission within the measurement gap based on indication in a DCI format. For example, the UE can reuse a TPC command in a DCI format that schedules a PUSCH/PUCCH transmission in an active UL BWP.

If a UE is provided with a configuration of SRS-TG, the UE can determine a system frame number (SFN) of a SRS-TG, i.e. SFN_TG, and the subframe or slot of a SRS-TG, i.e. sf TG, such that $$sfn_{MG}\mathrm{mod}\left(\frac{tgrp}{10}\right) = \left\lfloor\frac{gapOffset}{10}\right\rfloor,$$

$sf_{TG}$=gapOffset mod 10.

For a determined transmission gap for SRS BWP switching, a UE transmits SRS using one or more SRS resource set(s) with higher layer parameter usage set to 'antennaSwitching' and higher layer parameter resourceType in SRS-ResourceSet set to 'periodic' or 'semi-persistent' for each configured UL BWP that is enabled with SRS BWP switching. The UE does not expect to transmit any other UL channels or receive any DL channels within the transmission gap. The UE determines the order of UL BWPs for SRS transmission within the transmission gap based on a configuration of the periodic/semi-persistent SRS resources in the configured UL BWPs or based on an order of UL BWP indexes. Alternatively, the UE can be provided with one or more transmission gaps for SRS BWP switching, where each transmission gap is associated with a set of UL BWPs. In one example, the associated set of UL BWPs can be provided in the configuration for the respective transmission gap. In another example, the associated set of UL BWPs can be fixed, for example, all configured UL BWPs excluding active UL BWP. For each transmission gap, the transmit periodic or semi-persistent SRS in each UL BWP from the associated set of UL BWPs within the transmission gap.

For example, for two consecutive SRS transmissions in two different UL BWP, i, and UL BWP j, where the SRS transmission occasion in UL BWP j is after the SRS transmission occasion in UL i, if the time offset between the start of transmission occasion for SRS transmission in UL BWP i and the start of transmission occasion for SRS transmission in UL BWP j, is smaller than a BWP switching delay, T0, the UE drops the SRS transmission in UL BWP j; otherwise, the UE transmits SRS on both UL BWP i and UL BWP j. The BWP switching delay for SRS BWP switching, T0, can be either provided by higher layers or reported by UE. The BWP switching delay can also depend on a configuration for the UL BWPs, for example, on whether or not the UL BWPs have a same center frequency.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    receiving first information for a set of uplink (UL) bandwidth parts (BWPs) of a serving cell, wherein the set of UL BWPs includes more than one UL BWP;
    receiving second information, for each UL BWP from the set of UL BWPs, for sounding reference signal (SRS) resource sets;
    receiving third information that provides:
        a first periodicity for SRS transmissions only in an active UL BWP, and
        a second periodicity for SRS transmissions in each UL BWP from the set of UL BWPs;
    determining, for each UL BWP from the set of UL BWPs, corresponding first SRS resources from the SRS resource sets;
    transmitting a first SRS in the active UL BWP according to the first periodicity; and
    transmitting a second SRS, in each UL BWP from the set of UL BWPs, according to the second periodicity and using the corresponding first SRS resources.

2. The method of claim 1, further comprising:
    receiving fourth information providing a mapping among SRS resources for each UL BWP from the set of UL BWPs and values of a SRS request field;
    receiving a physical downlink control channel (PDCCH) that provides a downlink control information (DCI) format, wherein the DCI format includes the SRS request field; and
    determining, for each UL BWP from the set of UL BWPs, the corresponding first SRS resources based on the value of the SRS request field in the DCI format.

3. The method of claim 1, further comprising:
    receiving fourth information for a second set of UL BWPs, wherein the set of UL BWPs is a subset of the second set of UL BWPs;
    receiving fifth information providing a mapping among subsets of the second set of UL BWPs and values of a SRS request field; and
    receiving a physical downlink control channel (PDCCH) that provides a downlink control information (DCI) format, wherein the DCI format includes a SRS request field with a value that indicates the set of UL BWPs.

4. The method of claim 1, further comprising:
receiving fourth information providing a mapping among SRS resources, for each UL BWP from the set of UL BWPs, and values of a SRS request field;
receiving a physical downlink control channel (PDCCH) that provides a downlink control information (DCI) format, wherein:
the DCI format includes a number of SRS request fields equal to a number of UL BWPs in the set of UL BWPs, and
the SRS request fields have a one-to-one mapping with the UL BWPs; and
determining, for each UL BWP from the set of UL BWPs, the corresponding first SRS resources based on a value of a corresponding SRS request field in the DCI format.

5. The method of claim 1, further comprising:
receiving a physical downlink control channel (PDCCH) that provides a downlink control information (DCI) format that includes a transmission power control (TPC) command field;
determining a power based on the TPC command field; and
transmitting the second SRS in each UL BWP from the set of UL BWPs using the power.

6. The method of claim 1, wherein an active UL BWP is not included in the set of UL BWPs.

7. A user equipment (UE) comprising:
a transceiver configured to receive:
first information for a set of uplink (UL) bandwidth parts (BWPs) of a serving cell, wherein the set of UL BWPs includes more than one UL BWP,
second information, for each UL BWP from the set of UL BWPs, for sounding reference signal (SRS) resource sets,
third information that provides:
a first periodicity for SRS transmissions only in an active UL BWP, and
a second periodicity for SRS transmissions in each UL BWP from the set of UL BWPs; and
a processor operably connected to the transceiver, the processor configured to determine, for each UL BWP from the set of UL BWPs, corresponding first SRS resources from the SRS resource sets,
wherein the transceiver is further configured to transmit:
a first SRS in the active UL BWP according to the first periodicity, and
a second SRS, in each UL BWP from the set of UL BWPs, according to the second periodicity and using the corresponding first SRS resources.

8. The UE of claim 7, wherein:
the transceiver is further configured to receive:
fourth information providing a mapping among SRS resources for each UL BWP from the set of UL BWPs and values of a SRS request field, and
a physical downlink control channel (PDCCH) that provides a downlink control information (DCI) format, wherein the DCI format includes the SRS request field; and
the processor is further configured to determine, for each UL BWP from the set of UL BWPs, the corresponding first SRS resources based on the value of the SRS request field in the DCI format.

9. The UE of claim 7, wherein the transceiver is further configured to receive:
fourth information for a second set of UL BWPs, wherein the set of UL BWPs is a subset of the second set of UL BWPs,
fifth information providing a mapping among subsets of the second set of UL BWPs and values of a SRS request field, and
a physical downlink control channel (PDCCH) that provides a downlink control information (DCI) format, wherein the DCI format includes a SRS request field with a value that indicates the set of UL BWPs.

10. The UE of claim 7, wherein:
the transceiver is further configured to receive:
fourth information providing a mapping among SRS resources, for each UL BWP from the set of UL BWPs, and values of a SRS request field, and
a physical downlink control channel (PDCCH) that provides a downlink control information (DCI) format;
the DCI format includes a number of SRS request fields equal to a number of UL BWPs in the set of UL BWPs;
the SRS request fields have a one-to-one mapping with the UL BWPs; and
the processor is further configured to determine, for each UL BWP from the set of UL BWPs, the corresponding first SRS resources based on a value of a corresponding SRS request field in the DCI format.

11. The UE of claim 7, wherein:
the transceiver is further configured to receive a physical downlink control channel (PDCCH) that provides a downlink control information (DCI) format that includes a transmission power control (TPC) command field;
the processor is further configured to determine a power based on the TPC command field; and
the transceiver is further configured to transmit the second SRS in each UL BWP from the set of UL BWPs using the power.

12. The UE of claim 7, wherein an active UL BWP is not included in the set of UL BWPs.

13. A base station (BS) comprising:
a transceiver configured to transmit:
first information for a set of uplink (UL) bandwidth parts (BWPs) of a serving cell, wherein the set of UL BWPs includes more than one UL BWP, and
second information, for each UL BWP from the set of UL BWPs, for sounding reference signal (SRS) resource sets,
third information that provides:
a first periodicity for SRS transmissions only in an active UL BWP, and
a second periodicity for SRS transmissions in each UL BWP from the set of UL BWPs; and
a processor operably connected to the transceiver, the processor configured to determine, for each UL BWP from the set of UL BWPs, corresponding first SRS resources from the SRS resource sets,
wherein the transceiver is further configured to receive;
a first SRS in the active UL BWP according to the first periodicity, and
a second SRS, in each UL BWP from the set of UL BWPs, according to the second periodicity and using the corresponding first SRS resources.

14. The BS of claim 13, wherein:
the transceiver is further configured to transmit:
fourth information providing a mapping among SRS resources for each UL BWP from the set of UL BWPs and values of a SRS request field, and a physical downlink control channel (PDCCH) that provides a downlink control information (DCI) format, wherein the DCI format includes the SRS request field; and the processor is further configured to determine, for each UL BWP from the set of UL BWPs, the corresponding first SRS resources based on the value of the SRS request field in the DCI format.

15. The BS of claim 13, wherein the transceiver is further configured to transmit:
   fourth information for a second set of UL BWPs, wherein the set of UL BWPs is a subset of the second set of UL BWPs,
   fifth information providing a mapping among subsets of the second set of UL BWPs and values of a SRS request field, and
   a physical downlink control channel (PDCCH) that provides a downlink control information (DCI) format, wherein the DCI format includes a SRS request field with a value that indicates the set of UL BWPs.

16. The BS of claim 13, wherein:
the transceiver is further configured to transmit:
   fourth information providing a mapping among SRS resources, for each UL BWP from the set of UL BWPs, and values of a SRS request field, and
   a physical downlink control channel (PDCCH) that provides a downlink control information (DCI) format;
the DCI format includes a number of SRS request fields equal to a number of UL BWPs in the set of UL BWPs;
the SRS request fields have a one-to-one mapping with the UL BWPs; and
the processor is further configured to determine, for each UL BWP from the set of UL BWPs, the corresponding first SRS resources based on a value of a corresponding SRS request field in the DCI format.

17. The BS of claim 13, wherein an active UL BWP is not included in the set of UL BWPs.

* * * * *